(12) United States Patent
Biswas et al.

(10) Patent No.: US 12,234,766 B2
(45) Date of Patent: Feb. 25, 2025

(54) VARIABLE TURBINE GEOMETRY COMPONENT WEAR MITIGATION IN RADIAL TURBOMACHINES WITH DIVIDED VOLUTES BY AERODYNAMIC FORCE OPTIMIZATION AT ALL VANES OR ONLY VANE(S) ADJACENT TO VOLUTE TONGUE(S)

(71) Applicant: BorgWarner Inc., Auburn Hills, MI (US)

(72) Inventors: Abhishek Biswas, Asheville, NC (US); John Robert Zagone, Hendersonville, NC (US); Paul Troxler, Asheville, NC (US); Craig Andrew Colont, Candler, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/432,231

(22) Filed: Feb. 5, 2024

(65) Prior Publication Data
US 2024/0229714 A1 Jul. 11, 2024

Related U.S. Application Data

(63) Continuation of application No. 18/050,815, filed on Oct. 28, 2022, now Pat. No. 11,913,379.

(60) Provisional application No. 63/275,711, filed on Nov. 4, 2021.

(51) Int. Cl.
*F02C 7/042* (2006.01)
*F02C 6/12* (2006.01)

(52) U.S. Cl.
CPC ............... *F02C 7/042* (2013.01); *F02C 6/12* (2013.01); *F05D 2220/40* (2013.01); *F05D 2240/12* (2013.01); *F05D 2240/14* (2013.01)

(58) Field of Classification Search
CPC ........ F02C 6/12; F02C 7/042; F05D 2220/40; F05D 2240/12; F05D 2240/14; Y02T 10/12
See application file for complete search history.

(56) References Cited

U.S. PATENT DOCUMENTS

| 8,056,336 B2 | 11/2011 | Arnold et al. |
| 8,079,217 B2 | 12/2011 | Li et al. |
| 8,500,395 B2 | 8/2013 | Roby et al. |

(Continued)

FOREIGN PATENT DOCUMENTS

WO 2014140598 A1 9/2014

*Primary Examiner* — Jesse S Bogue
(74) *Attorney, Agent, or Firm* — Howard & Howard Attorneys PLLC

(57) ABSTRACT

An entryway system includes a divided volute turbocharger having variable turbine geometry (VTG). The turbocharger includes a turbine housing, first and second volutes separated by a wall having a first and second tongue, and a turbine housing outlet. The system also includes a turbine wheel disposed in the turbine housing and a vane ring disposed in the turbine housing between the turbine wheel and the volutes. The system includes design modifications of one or more of the VTG components and/or locations of such components to manipulate the aerodynamic forces and/or subsequent mechanical loads in the VTG mechanism of the entryway system to mitigate VTG component wear during normal usage.

17 Claims, 9 Drawing Sheets

(56) References Cited

U.S. PATENT DOCUMENTS

| | | | |
|---|---|---|---|
| 9,016,060 B2* | 4/2015 | Sauerstein | F01D 17/165 415/206 |
| 9,845,770 B2 | 12/2017 | Martinez-Botas et al. | |
| 10,227,889 B2* | 3/2019 | Arnold | F02C 6/12 |
| 10,900,415 B2* | 1/2021 | Eckl | F02C 6/12 |
| 11,333,071 B2 | 5/2022 | Williams et al. | |
| 11,408,294 B2 | 8/2022 | Comeau et al. | |
| 11,530,618 B2* | 12/2022 | Jaeger | F01D 17/165 |
| 2011/0014032 A1 | 1/2011 | Boening et al. | |
| 2017/0044927 A1* | 2/2017 | Morgan | F01D 11/122 |
| 2018/0266268 A1* | 9/2018 | Karstadt | F01D 9/026 |
| 2021/0108555 A1 | 4/2021 | Troxler et al. | |
| 2021/0140366 A1 | 5/2021 | Williams et al. | |
| 2022/0074314 A1 | 3/2022 | Biswas et al. | |
| 2023/0135874 A1 | 5/2023 | Biswas et al. | |

* cited by examiner

VARIABLE TURBINE GEOMETRY COMPONENT WEAR MITIGATION IN RADIAL TURBOMACHINES WITH DIVIDED VOLUTES BY AERODYNAMIC FORCE OPTIMIZATION AT ALL VANES OR ONLY VANE(S) ADJACENT TO VOLUTE TONGUE(S)

CROSS-REFERENCE TO RELATED APPLICATIONS

The present disclosure is a continuation of U.S. patent application Ser. No. 18/050,815, filed Oct. 28, 2022, which claims priority from U.S. Provisional App. Ser. No. 63/275,711, filed Nov. 4, 2021, the entirety of which are herein incorporated by reference.

FIELD OF THE DISCLOSURE

This disclosure relates generally to an entryway system including a divided volute turbocharger having variable turbine geometry.

DESCRIPTION OF THE RELATED ART

Turbochargers receive exhaust gas from an internal combustion engine and deliver compressed air to the internal combustion engine. Turbochargers increase the power output of the internal combustion engine, lower fuel consumption of the internal combustion engine, and/or reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use in a vehicle reduces the mass and aerodynamic frontal area of the vehicle, which helps reduce fuel consumption of the internal combustion engine and improve fuel economy of the vehicle.

Some turbochargers include a turbine having a divided volute turbine housing, with the turbochargers therefore sometimes alternatively referred to as a divided volute turbocharger (or, when two volutes are utilized, a dual volute turbocharger). The volutes of a divided volute turbine housing are generally isolated from one another such that no mixing of exhaust gas occurs until after the exhaust gas passes the tongues of the respective volutes. The divided volute turbine housing includes a turbine inlet, a turbine outlet, and an interior volume. The turbine inlet is configured for attachment to an internal combustion engine (e.g., to an exhaust manifold or to a cylinder head of an internal combustion engine) and includes a plurality of inlet ports configured to be in fluid communication with exhaust paths of the internal combustion engine upon attachment. The interior volume of the turbine housing defines at least two divided volutes in fluid communication with the respective inlet ports for delivering exhaust gas from the internal combustion engine to a turbine wheel disposed in the interior volume. After energy is extracted from the exhaust gas by the turbine wheel, the exhaust gas exits the turbine housing via the turbine outlet. The volutes guide the exhaust gas from the exhaust manifold of the engine into an arcuate flow for distribution of exhaust around the circumference of the turbine wheel to rotate the turbine wheel.

Turbochargers also include a compressor. The compressor includes a compressor wheel coupled to the turbine wheel via a shaft. The compressor is powered by the rotation of the turbine wheel, which in turn drives a compressor wheel within a compressor housing of the compressor.

In multi-cylinder engines, cylinders fire in a specific order. For example, in an inline four-cylinder engine in which the cylinders are sequentially numbered 1 through 4, the firing order may be 1-3-4-2. A collection of cylinders may be grouped into a 'bank'. In the above example, a first bank of cylinders would include cylinders 1 and 4 and a second bank of cylinders would include cylinders 2 and 3. In the case of a "V" engine, the banks of cylinders can be separated across the engine, and multiple cylinders may be firing at the same time. In the case of an inline engine, the banks of cylinders could simply be the front cylinders versus the back cylinders, or an alternate collection of cylinders as described above. Exhaust gas flow is not a smooth stream because exhaust gases exit each cylinder based on the engine's firing sequence, resulting in intermittent exhaust gas pulses. The exhaust gas from each bank is conducted to the turbine housing in respective manifolds. The manifolds may be pipes and/or ducts attached to the internal combustion engine or may be integral to the internal combustion engine (e.g., manifold ducts cast into a cylinder head of the engine). By separating the exhaust gas streams, the "pulses" of pressure that occurs when the exhaust gas is released from the cylinder may be preserved through the volutes such that the pressure pulses impinge on the turbine wheel. The preservation of the pulses is typically desirable because the pressure pulse imparts momentum to the turbine wheel, thereby accelerating the turbine wheel faster and reducing turbo lag. Effective separation of the gas streams also reduces the instantaneous backpressure in the "non fired" volute. The term "fired" volute refers to the volute with the pressure pulse passing through it. This separation of pulse begins at the exhaust of each cylinder and is maintained in the exhaust manifold up to the turbine inlet (sometimes alternatively referred to as a turbine inlet scroll). In the region where the exhaust gases are admitted to the turbine housing, a separator wall between the respective volutes can help preserve the separation between exhaust gases from each cylinder or cylinder group, and thus maintain the pressure pulses.

To aid in directing and controlling the exhaust flow from the volute or divided volutes to the turbine wheel uniformly, a vane ring (sometimes alternatively referred to as a nozzle ring or vaned nozzle stator) with a plurality of vanes can be disposed on an annular disk in the turbine housing interior between the volutes and turbine wheel. These vanes can be fixed to the annular disk (sometimes alternatively referred to as a fixed nozzle ring or fixed vaned nozzle stator) or can be rotatably coupled to the annular disk (sometimes alternatively referred to as a variable nozzle ring or variable vaned nozzle stator) to create a variable turbine geometry (VTG).

Variable Turbine Geometry (VTG) nozzle rings in radial turbomachinery typically use a multitude of circumferentially equally spaced vanes to direct and control the flow into the turbine wheel. Furthermore spacers (or other mechanisms to space the upper and lower vane rings) are typically placed outside of the vane ring circle in order to minimize the flow disturbance. In a dual volute manifold, increased aerodynamic forces especially from pressure reversals through flow in each volute, lead to increased wear in the VTG components, particularly at vanes (and contacting components such as vane levers, an actuation ring, and vane rings) circumferentially positioned closest to the turbine housing tongues for each scroll.

SUMMARY OF THE DISCLOSURE AND ADVANTAGES

The subject disclosure provides for various design aspects in an entryway system manipulating the aerodynamic forces and/or subsequent mechanical loads in the VTG mechanism for managing the wear of VTG components. Such design modifications may include vane geometry optimization (shape, chord length, pivot axis location), asymmetric vane spacing, vane orientation and leading edge positioning of the vanes and alignment relative to the turbine tongue(s), vane fixation for vane(s) closest to the tongue(s), or geometry optimization of VTG spacers with anti-rotation features and combinations thereof. Each of these solutions can be applied individually or in combination in accordance with the required efficacy of wear mitigation for a specific turbine stage.

The various modification of the various design modifications managing the wear of VTG components has been illustrated herein without significantly altering the benefits of the prior design of the entryway system in terms of the overall turbine stage efficiency, pulse capture and engine BSFC reduction, while these modifications are also believed to not otherwise significantly changing the maintained benefits for thermal management, engine braking, efficiency towards rated and transient response.

BRIEF DESCRIPTION OF THE DRAWINGS

Other advantages of the present disclosure will be readily appreciated, as the same becomes better understood by reference to the following detailed description when considered in connection with the accompanying drawings wherein.

DETAILED DESCRIPTION OF THE DISCLOSURE

Figure 1:
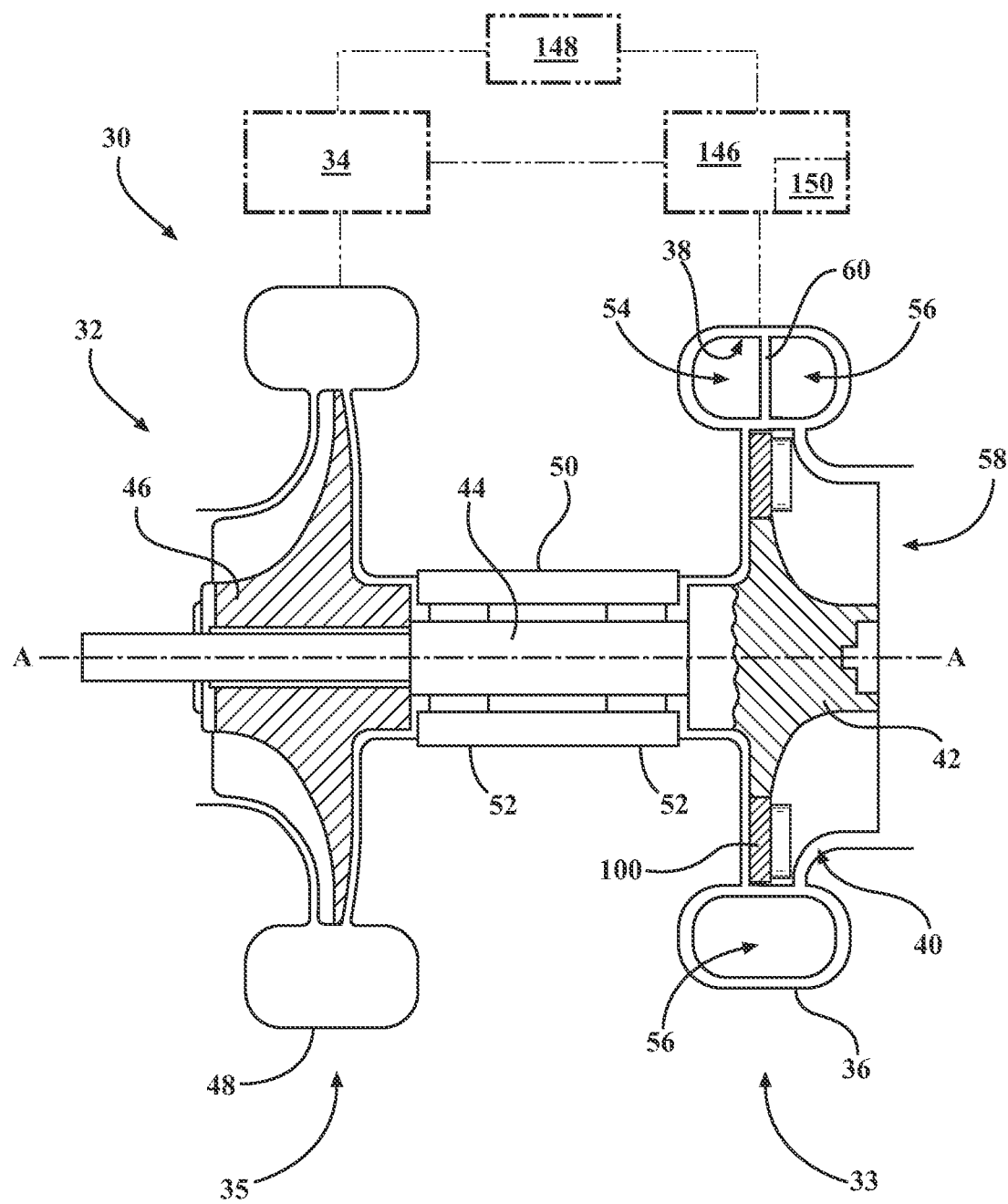
FIG. 1 is a schematic representation of a system including a turbocharger having variable turbine geometry and having a dual volute turbine housing, turbine wheel disposed in the turbine housing.

With reference to the FIGS., wherein like numerals indicate like parts throughout the several views, a schematic representation of a system 30 (i.e., an entryway system 30) is shown in FIG. 1. The system 30 includes a turbocharger 32 having a turbine portion 33 for receiving exhaust gas from an internal combustion engine 34 and a compressor portion 35 for delivering compressed air to the internal combustion engine 34. Although not required, the turbocharger 32 is typically used in passenger and commercial automotive applications. However, it is to be appreciated that the turbocharger 32 may be used in non-automotive applications such as heavy equipment applications, non-automotive diesel engine applications, non-automotive motor applications, and the like.

The turbine portion 33 includes a turbine housing 36 having an interior surface 38 defining the turbine housing interior 40. The turbine housing interior 40 is adapted to receive a turbine wheel 42 having a plurality of turbine blades (not shown), typically a plurality of evenly spaced turbine blades. In addition, the turbocharger 32 typically includes a turbocharger shaft 44, a compressor wheel 46, a compressor housing 48, and a bearing housing 50. During operation of the turbocharger 32, the turbine wheel 42 (and in particular the turbine blades of the turbine wheel 42) receives exhaust gas from the internal combustion engine 34 which causes the turbine wheel 42 to rotate. When present, the turbocharger shaft 44 is coupled to and rotatable by the turbine wheel 42. When present, the compressor wheel 46 is disposed in the compressor housing 48, is coupled to the turbocharger shaft 44, and is rotatable by the turbocharger shaft 44 for delivering compressed air to the internal combustion engine 34. The bearing housing 50 extends about the turbocharger shaft 44 between the turbine wheel 42 and the compressor wheel 46. The turbocharger 32 also typically includes bearings 52 disposed about the turbocharger shaft 44 and in the bearing housing 50 for rotatably supporting the turbocharger shaft 44.

The interior surface 38 of the turbine housing 36 also defines a plurality of volutes separated by walls, and hence the turbine housing 36 is defined as a divided volute turbine housing. In one exemplary embodiment, the divided volute turbine housing 36 is a dual volute turbine housing 36, and hence the interior surface 38 defines a first volute 54 and a second volute 56 that are respectfully separated by a wall 60. The wall 60 includes first and second tongues 61, 63 (see FIGS. 3-9), which represent different portions of the wall 60 spaced from each other that separates portions of the first and second volutes 54, 56.

For case of description herein after, the turbocharger 32 will be further explained as including a dual volute turbine housing 36. However, embodiments of turbine housings having additional numbers of volutes (e.g., three volutes or four volutes) are within the scope described herein.

The first and second volutes 54, 56 are each in fluid communication with the internal combustion engine 34 and the turbine housing interior 40 for delivering exhaust gas from the internal combustion engine 34 to the turbine housing interior 40. As also shown in FIG. 1, the interior surface 38 also defines a turbine housing outlet 58. The turbine housing outlet 58 is in fluid communication with the turbine housing interior 40 for discharging exhaust gas from the turbine housing interior 40. In addition, the inner surface 38 also defines a wastegate (not shown) fluidically coupling each or either of the first and second volutes 54, 56 to the turbine housing outlet 58. The turbine housing 36 may be comprised of any suitable metal. Typically, the turbine housing 36 is comprised of iron or a steel alloy.

In certain embodiments, as also shown in FIG. 1, the system 30 also includes a controller 146 that is coupled to turbocharger 32 and/or to the internal combustion engine 34 that controls the various other components of the turbocharger 32 and/or internal combustion engine 34. The controller 146 may include one or more processors, or microprocessors, for processing instructions stored in memory 150 to control various functions on the turbocharger 32 related to the introduction of the exhaust gas within the turbine housing interior 40 through the first and second volutes 54, 56. Such instructions may be any of the functions, algorithms or techniques described herein performed by the controller 146. Additionally, or alternatively, the controller 146 may include one or more microcontrollers, field programmable gate arrays, systems on a chip, discrete circuitry, and/or other suitable hardware, software, or firmware that is capable of carrying out the functions described herein. In some embodiments, the controller 146 is an engine control unit (ECU) that controls the various other components of the turbocharger 32 and/or internal combustion engine 34. In embodiments where the controller 146 is the engine control unit, the controller 146 is separate from the turbocharger 32. In other words, the controller 146 is a separate component that is not included on or in the turbocharger 32. In other embodiments, the controller 146 is discrete from the ECU. For example, the controller 146 may be included on or in the turbocharger 32. In other words, the controller 146 is a component included on or in the turbocharger 32. With reference to FIG. 1, the system 30 may include the turbocharger 32, the internal combustion engine 34, and the controller 146. Typically, the system 30 also includes at least one sensor 148.

While not illustrated in FIG. 1, the internal combustion engine 34 includes a plurality of cylinders. For example, the internal combustion engine 34 may include two cylinders, four cylinders, six cylinders, eight cylinders, or more cylinders. The internal combustion engine 34 may also include an odd number of cylinders (e.g., three cylinders or five cylinders). The internal combustion engine 34 may have a V-engine configuration, a flat/boxer engine configuration, a W-engine configuration, an inline engine configuration, and the like. In the illustrated embodiment, the internal combustion engine 34 has an inline engine configuration. The internal combustion engine 34 includes a first group of cylinders and a second group of cylinders, with the first and second groups of cylinders each typically including half of the cylinders that are included in the internal combustion engine 34. The first and second groups of cylinders produce exhaust gas in a series of pulses corresponding to an exhaust stroke of each of the first and second groups of cylinders. Timing of the exhaust strokes of the cylinders is such that pulses of exhaust gas are alternately emitted from the first group of cylinders and the second group of cylinders. The area of the first volute 54, in combination with the produced gas from the exhaust stroke of the first set of cylinders, defines a first volute flow parameter. Similarly, the corresponding area of the second volute 56, in combination with the produced gas from the exhaust stroke of the second set of cylinders, defines a second volute flow parameter. The volute flow parameter δ for a volute (such as the first and second volute flow parameter of the respective first and second volute 54, 56 (as provided herein)) is calculated by the equation:

$$\delta = \frac{\dot{m}\sqrt{T}}{P}$$

wherein m is the mass flow through the volute, T is the exhaust gas temperature at the inlet of the volute, and P is the exhaust gas pressure at the inlet of the volute. Typically, the volute flow parameter δ is measure for each respective exhaust stroke of the respective one of the first and second set of cylinders.

As noted above typically the first group of cylinders are in fluid communication with the first volute 54 and the second group of cylinders are in communication with the second volute 56. In this manner, pulses of exhaust gas from the first and second groups of cylinders flow through the first and second volutes 54, 56, respectively, and to the turbine housing interior 40, where the pulses of exhaust gas rotate the turbine wheel 42. The respective pulses of exhaust gas flowing through the first volute 54 from the first group of cylinders (typically measured for each exhaust stroke) and area of the first volute 54 define a first volute flow parameter, while the respective pulses of exhaust gas flowing through the second volute 56 from the second group of cylinders (again typically measured for each exhaust stroke) and area of the second volute 56 define a second volute flow parameter. Owing to the difference in sizes of the areas of the first and second volutes 54, 56, the first and second volute flow parameters are generally different from one another.

Figure 2:
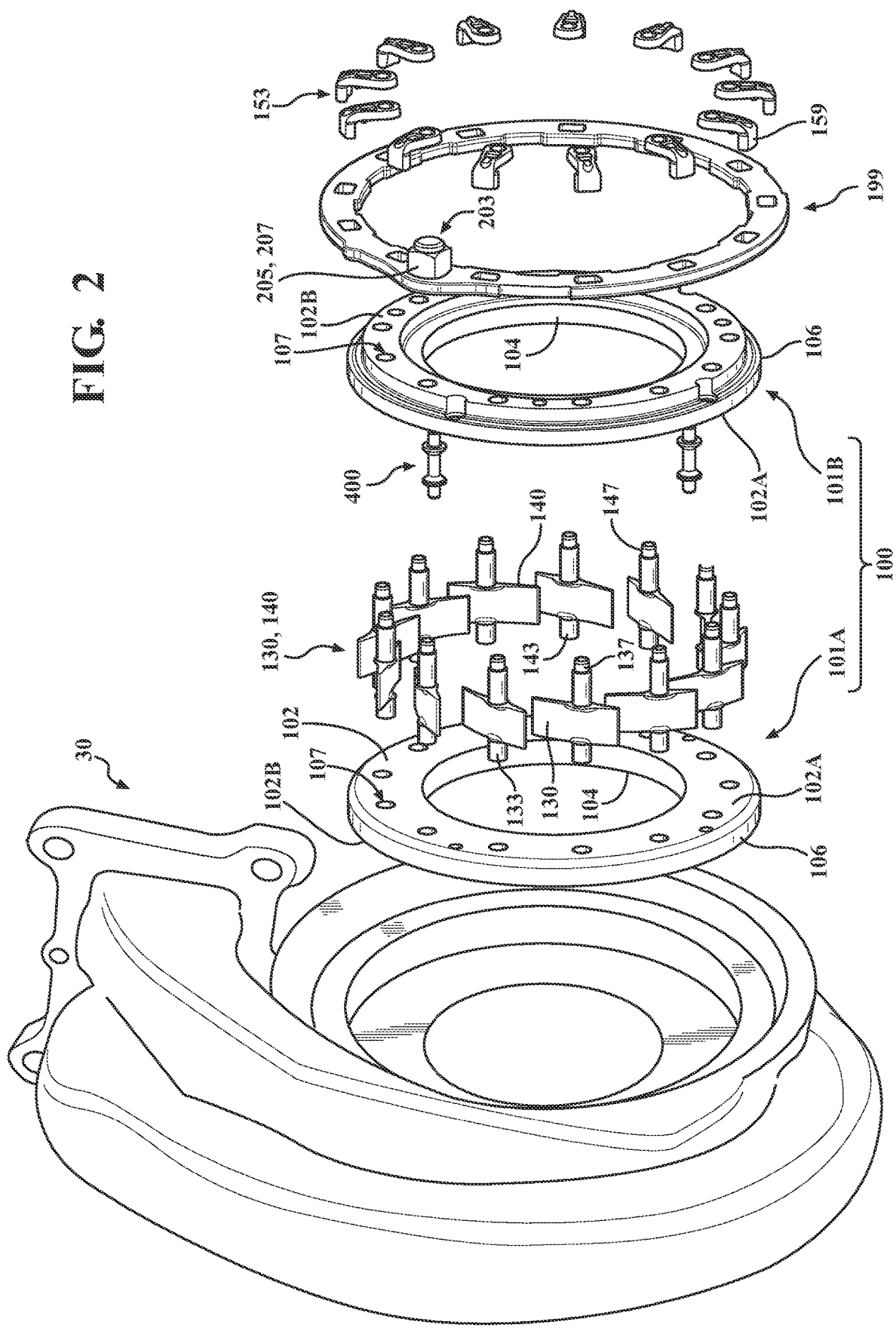
FIG. 2 is an exploded view of a portion of a schematic representation of an internal combustion engine and a cross-sectional end view of the dual volute turbine housing of FIG. 1 adapted for fluid communication with an internal combustion engine that also includes a portion of a vane ring having rotatable vanes disposed on an annular disk and aerodynamic spacers.

In addition to the turbocharger 32, as also shown in FIG. 2, the entryway system 30 also includes a vane ring 100 (also referred to as a VTG cartridge or Vane Pack Assembly) disposed in the turbine housing interior 40 between the first and second volutes 54, 56 and around the turbine wheel 42, with the vane ring having plurality of vanes, shown as first and second set of vanes 130 and 140, rotatably disposed to the vane ring 100 in an asymmetric vane pattern. The entryway system 30 also includes a plurality of spacers 400 disposed in a spaced apart manner on the vane ring 100, with the vanes on the vane ring 100 and spacers 400 functioning to control the flow of exhaust gas flowing from the one or more volutes 54, 56 to the turbine wheel 42. In particular, the spacers 400 function to minimize flow disturbance of exhaust gas flowing from the one or more volutes 54, 56 to the turbine wheel 42.

The vane ring 100 includes an annular disk 101 disposed in the turbine housing interior 40 between the divided first and second volutes 54, 56 and the turbine wheel 42. In certain embodiments, the vane ring 100 includes two spaced apart annular disks 101A, 101B (the annular disk 101A may sometimes referred to as a first annular disk 101A or lower vane ring (LVR) 101A, while disk 101B may sometimes referred to as a second annular disk 101B or upper vane ring (UVR) 101B), which the plurality of vanes 130, 140 rotatably disposed between the vane rings 100A, 100B in the afore-mentioned vane pattern. The vane ring 100 includes the plurality of vanes 130, 140 (shown as first and set of vanes 130 and 140 in FIGS. 2-9) rotatably disposed to the vane ring 100 in a prespecified vane pattern. In these embodiments, the spacers 400 also function to provide an axial separation function between the first and second annular disks 101A, 101B, and thereby maintain clearance between the annular disks 101A, 101B and the vanes 130, 140.

Each of the annular disks 101A and 101B includes a vane ring surface 102 which includes an inner vane ring surface 102A and an opposing outer vane ring surface 102B extending between an inner circumferential edge 104 and an outer circumferential edge 106. The inner circumferential edge 104 defines a circular orifice for receiving the turbine wheel 42 of the turbocharger 32. In particular, the vane ring 100 is disposed in the turbine housing 36 with the first and second tongue 61, 63 each separately terminating at a position adjacent to the outer circumferential ring 106.

Each of the annular disks 101A and 101B also defines a plurality of first openings 107 within the inner vane ring surface 102A between the inner circumferential edge 104 and an outer circumferential edge 106, with the number of openings 107 corresponding to the number of the plurality of vanes 130, 140 and configured to receive a shaft 139, 149 of a respective one of the plurality of vanes 130, 140, as will be explained further below. The openings 107 therefore further define the vane pivot point (VPP) of the respective one vane of the plurality of vanes 130, 140 disposed therein. In FIG. 2 that includes the first and second annular disks 101A, 101B, the plurality of openings 107 in at least one the first and second annular disks 101A, 101B extend from the inner vane ring surface 102A to the outer vane ring surface 102B such that the entirety of the second shafts 137, 147 extends through the opening 107 of the second annular disk 101B and such that the vane levers 153 are positioned within the turbine housing interior 40 between the outer vane ring surface 102B of the second annular disk 101B and the turbine housing 36.

As also shown in FIG. 2, a vane lever 153 is coupled, and preferably fixed via riveting or welding, to the second shafts 137, 147 of the vanes 130, 140 and also includes a flange portion 159. The vane levers 153 are configured to rotate each of the vanes 130 and 140 in a coordinated manner about their respective vane pivot point (VPP) between a closed position and an open position and through one or more intermediate positions, as will be explained further below. An adjustment ring 199 is retained between the vane levers 153 and the second annular disk 101B, with the flange portion 159 of each of the vane levers 153 disposed within an opening in the adjustment ring 199. An assembly 203 including a pin 205 and block 207 is affixed to the adjustment ring 199, such as by riveting or welding, with a pivot having a pivot shaft (not shown) connecting the assembly 203. The pivot shaft is rotated by a linkage (not shown) connected to an actuator (not shown). The actuator rotates the linkage on the basis of a particular engine operating condition to adjust the flow of exhaust gas through the vanes 130, 140. In particular, the actuator rotates the linkage, which rotates the pivot shaft and adjustment ring 199 through the assembly 203. The rotation of the adjustment ring 199 causes the adjustment ring 199 to contact the flange portion 159 of the vane levers 153 and rotates the vane levers 153 in response, which in turn causes the coupled vanes 130, 140 to move between the closed and open positions and through one or more intermediate positions to adjust the flow of exhaust gas through the vanes 130, 140 on the basis of an engine operating condition, such as engine speed. The closed position, as defined below, is a position in which the pulses of gas from the respective volutes 54, 56 through the respective vanes 130, 140 is minimized, while conversely the open position is a position in which the pulses of gas from the respective volutes 54, 56 through the respective vanes 130, 140 is maximized. Intermediate positions are therefore positions in which the pulses of gas from the respective volutes 54, 56 through the respective vanes 130, 140 are between a minimum and maximum value.

Figure 3:
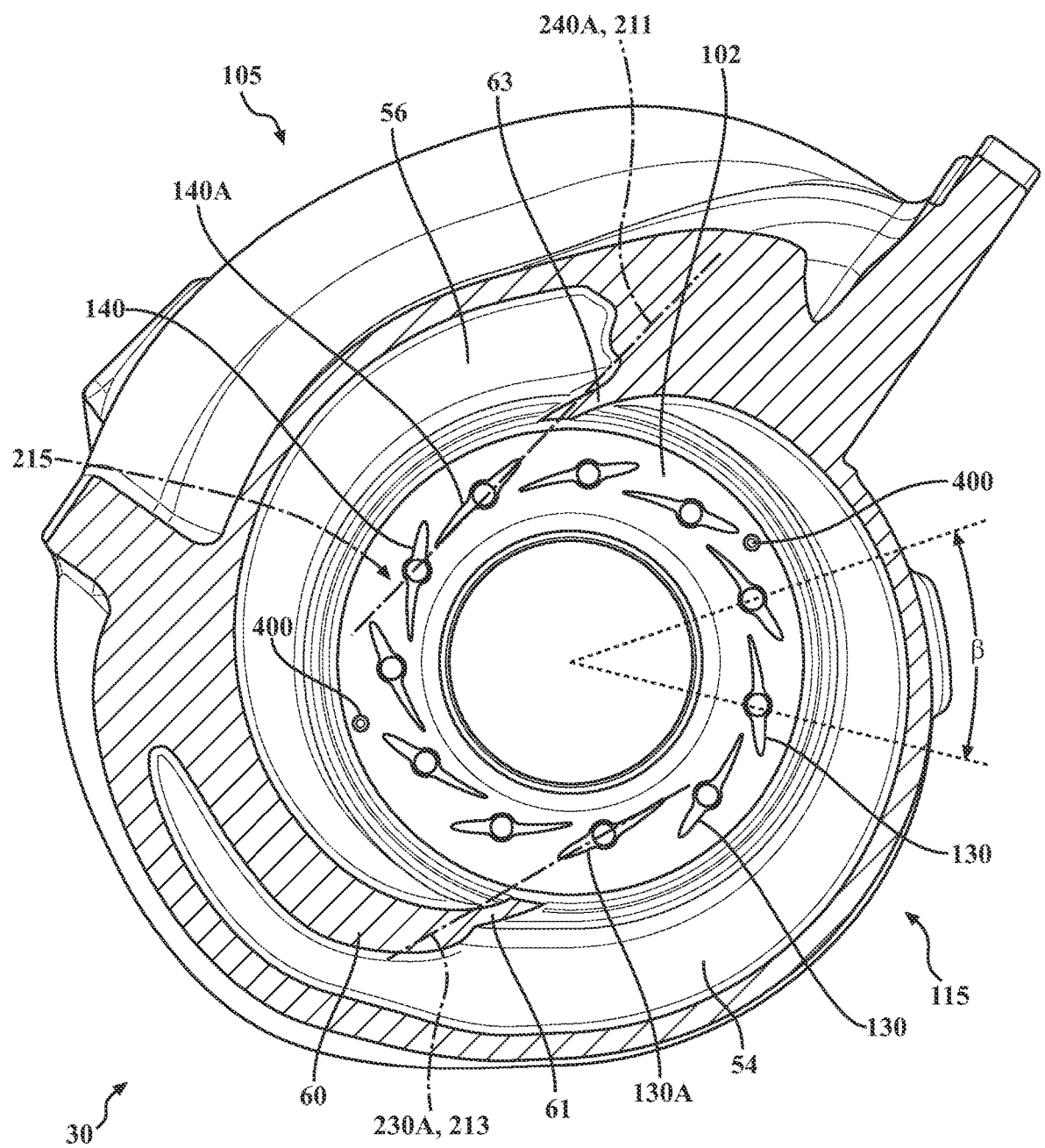
FIG. 3 is an end view of a baseline configuration of the vane ring and a portion of the dual volute turbine housing of FIG. 1 that also includes a portion of a vane ring having equally spaced rotatable vanes defining a first and second set of vanes disposed on an annular disk and aerodynamic spacers and wherein that a lengthwise axis of a closest adjacent tongue vane of each of the first and second set of vanes is aligned with a corresponding tongue axis of one of the first and second tongues of the wall that divides the first and second volute in an open position.

Referring now to FIG. 3, which generally represents one configuration of vanes 130, 140 for the entryway system 30 in a baseline configuration, the first set of vanes 130 (i.e., a first set of at least two vanes 130) are rotatably disposed in a spaced apart manner from one another on the vane ring surface 102 such that the first set of vanes 130 are positioned downstream of the first volute 54. Still further, the second set of vanes 140 are rotatably disposed in a spaced apart manner from one another such that the second set of vanes 140 (i.e., a second set of at least two vanes 140) are positioned downstream of the second volute 56. Each of the vanes 130, 140 are rotatable along the vane ring surface 102, and in particular are rotatable along the inner vane ring surface 102A of a respective annular ring 101A, 101B about a vane pivot axis between a closed position and an open position and through one or more intermediate positions between the closed and open position. The vane pivot axis, as defined herein, extends in a direction normal to a plane defining the vane ring surface 102 of the vane ring 100.

Still further, in the embodiment illustrated in FIG. 3, the first set of vanes 130 includes six vanes 130 positioned adjacent to one another of the vane ring surface 102 around the vane ring 100, while the second set of vanes 140 includes five vanes 140 positioned adjacent to one another of the vane ring surface 102 around the vane ring 100. Accordingly, there are a total of eleven vanes 130, 140 on the vane ring 102 in the embodiment of FIG. 3, which provide exhaust flow to the turbine wheel 42 having a total of eleven equally spaced turbine blades 45. While the embodiments provided herein include eleven vanes 130, 140 and eleven turbine blades 45, alternative relative amounts of vanes and blades are contemplated, preferably wherein the number of vanes 130, 140 is an odd number, such as a prime number (such as, for example, in FIG. 2 which illustrates thirteen vanes 130, 140). In addition, each of the vanes 130 and 140 includes a vane blade 131 or 141 each having a respective inner surface 131A, 141A and an opposing outer surface 131B, 141B with each of the vanes 130, 140 extending in length between a leading edge 132, 142 and a trailing edge 134, 144 and extending in width between the inner surface 131A, 141A and the opposing outer surface 131B, 141B.

FIG. 3 illustrates a baseline configuration of the annular disk 101 of the vane ring 100 with rotatable vanes 130, 140 rotatably disposed thereon for use in the entryway system 30 of FIG. 1 in which the first and second volutes 54, 56 are configured with first and second volute 54, 56 separation, with each volute 54, 56 having an identical respective (minimum) cross-sectional area defined as the volute throat, just upstream of the interface with the vane ring 100, alternatively referred to as identical critical throat areas at the interface with the vane ring 100. The positioning of the first and second tongues 61, 63 are configured wherein a first tongue clocking angle between the first and second tongues 61, 63 corresponding to the first arcuate region 105 is less than 180 degrees (see FIG. 3), while a second tongue clocking angle between the between the first and second tongues 61, 63 corresponding to the second arcuate region 115 (also see FIG. 3) is greater than 180 degrees, with the total combined degrees of the first and second clocking angles equals 360 degrees. In further embodiments, the positioning of the first and second tongues 61, 63 are configured wherein a first tongue clocking angle between the first and second tongues 61, 63 corresponding to the first arcuate region 105 is greater than 180 degrees (see FIG. 3), while a second tongue clocking angle between the between the first and second tongues 61, 63 corresponding to the second arcuate region 115 (also see FIG. 3) is less than 180 degrees, with the total combined degrees of the first and second clocking angles equals 360 degrees. In still further embodiments, the first and second clocking angles may each be 180 degrees, but wherein there is a degree of asymmetry in the vane configuration of the vanes 130, 140, such as through asymmetric vane spacing.

In FIG. 3, the entryway system 30 having a baseline configuration is configured wherein each of the respective vanes 130, 140 is the same, with each of the respective vane pivot points (VPP) of the respective vanes 130, 140 (corresponding an axis defined by the length of the first shaft 133, 143 and an opposing second shaft 137, 147 of the respective vanes 130, 140 and corresponding to the openings 107 in the annular disk 101A) being located along the same circumferential vane pitch circle radii from a center rotation axis with each of the first shaft 133, 143 and an opposing second shaft 137, 147 of the respective vanes 130, 140 located in certain embodiments approximately midway between the inner circumferential edge 104 and the outer circumferential edge 106, although in other embodiments the position may be closer to or further from the inner circumferential edge 104. Still further, the vane spacing (β) of each of the respective eleven vanes 130, 140, as shown in FIG. 3, corresponds to an equiangular vane spacing angle (β) of about 32.7 degrees.

In certain embodiments, the second shaft 137 is an extension of the first shaft 133, and the second shaft 147 is an extension of the first shaft 141. In still further embodiments, the second shaft 137 is an extension of and integrally formed with the first shaft 133, and the second shaft 147 is an extension of and integrally formed with the first shaft 141. In these embodiments, the first and second shaft 133, 137 of vane 130 may simply referred to as a shaft 139 of vane 130, while the first and second shaft 143, 147 of vane 140 may simply referred to as shaft 149 of vane 140.

Still further, in the baseline configuration of FIG. 3, the virtual extension of an extended length of one vane 130A (i.e., an aligned one vane 130A, also referred to as a tongue vane 130A or first tongue vane 130A) of the first set of vanes 130, defining by a vane axis 230A or first vane axis 230A, is aligned along a first tongue axis 213 defined by a virtual extended length of the first tongue 61, while the virtual extension of an extended length of one vane 140A (i.e., an aligned one vane 140A, also referred to as a tongue vane 140A or second tongue vane 140A) of the second set of vanes 140, defining a vane axis 240A or second vane axis 240A, is aligned along a second tongue axis 211 defined by a virtual extended length of the second tongue 63 when the tongue vanes 130A, 140A are in an open position. The length of a respective vane 130, 140 (including the length of the respective tongue vane 130A, 140A), is the distance between a leading edge 132, 142 and a trailing edge 134, 144 of each respective vane 130, 140. When the respective axis 213, 230A along the tongue vane 130A and first tongue 61 are collinear or generally parallel to one another and close to collinear, the axis 230A of the tongue vane 130A is defined herein to be aligned along the axis 213 with the first tongue 61. Similarly, when the respective axis 240A along the tongue vane 140A and the axis 211 along the second tongue 63 are collinear or generally parallel to one another and close to collinear, the axis 240A of the tongue vane 140A is defined herein to be aligned along the axis 211 with the second tongue 63.

Still further, in the baseline configuration of FIG. 3, the length of the tongues 61, 63 extends all the way to the outer diameter 106 of the vane ring 100, and as illustrated to the outer diameter of each of the respective annular disks 101A, 101B. Accordingly, in the baseline configuration of FIG. 3, when the vanes 130, 140 are positioned in the closed position, the pulses of exhaust gas from the cylinders via the respective volute 54, 56 through the respective vanes 130, 140 to the turbine wheel 42 can be precisely controlled in order to optimize turbine stage efficiency, pulse capture and engine BSFC reduction while maintaining benefits for thermal management, engine braking, and efficiency towards rated and transient response. Notably, there is minimal leakage of exhaust gas between the aligned one vane 130A and the first tongue 61, and between the aligned one vane 140A and the second tongue 63.

However, while providing these benefits, the baseline configuration of FIG. 3 exhibited wear in various VTG components, and in particular to the vane levers 153 associated with the vanes 130, 140 adjacent to the tongues 61, 63 of the wall 60, the adjustment ring 199, and the annular disk 101A, 101B of the vane ring 100. This increased wear is believed to be attributed in part, and in certain embodiments in a significant part, due to increased aerodynamic forces of the pulses of exhaust gas and mechanical loads in the VTG mechanism for the entryway system 30, especially from pressure reversals through flow in each volute 54, 56, which leads to the afore-mentioned wear in the various VTG components described immediately above.

In the exemplary embodiments of the subject application disclosed herein in FIGS. 4-9, various methods of manipulating the aerodynamic forces and/or subsequent mechanical loads in the VTG mechanism of the entryway system 30 are provided that include individual or various combinations of vane geometry, vane fixation, vane spacing, spacer geometry, vane to tongue relationship, and/or vane to housing relationship. By manipulating the aerodynamic forces and/or subsequent mechanical loads in the VTG mechanism, VTG component wear can be mitigated during normal usage of vehicles or components of engines.

In each of these alternative embodiments of FIGS. 4-9, modifications of one or more components of the VTG mechanism, or the location of these components, of the baseline configuration of FIG. 3 are provided that do not significantly impact the performance characteristics of the modified entryway system 30 in terms of optimized turbine stage efficiency, pulse capture and engine BSFC reduction as compared to the baseline configuration of FIG. 3, all while maintaining benefits for thermal management, engine braking, and efficiency towards rated and transient response similar to that of FIG. 3. Notably, however, each of the alternative embodiments reduces the aerodynamic forces and/or subsequent mechanical loads in the VTG mechanism of the entryway system 30 and thereby reduce or mitigate the wear on the VTG components that may occur in the baseline configuration of FIG. 3.

Figure 4:
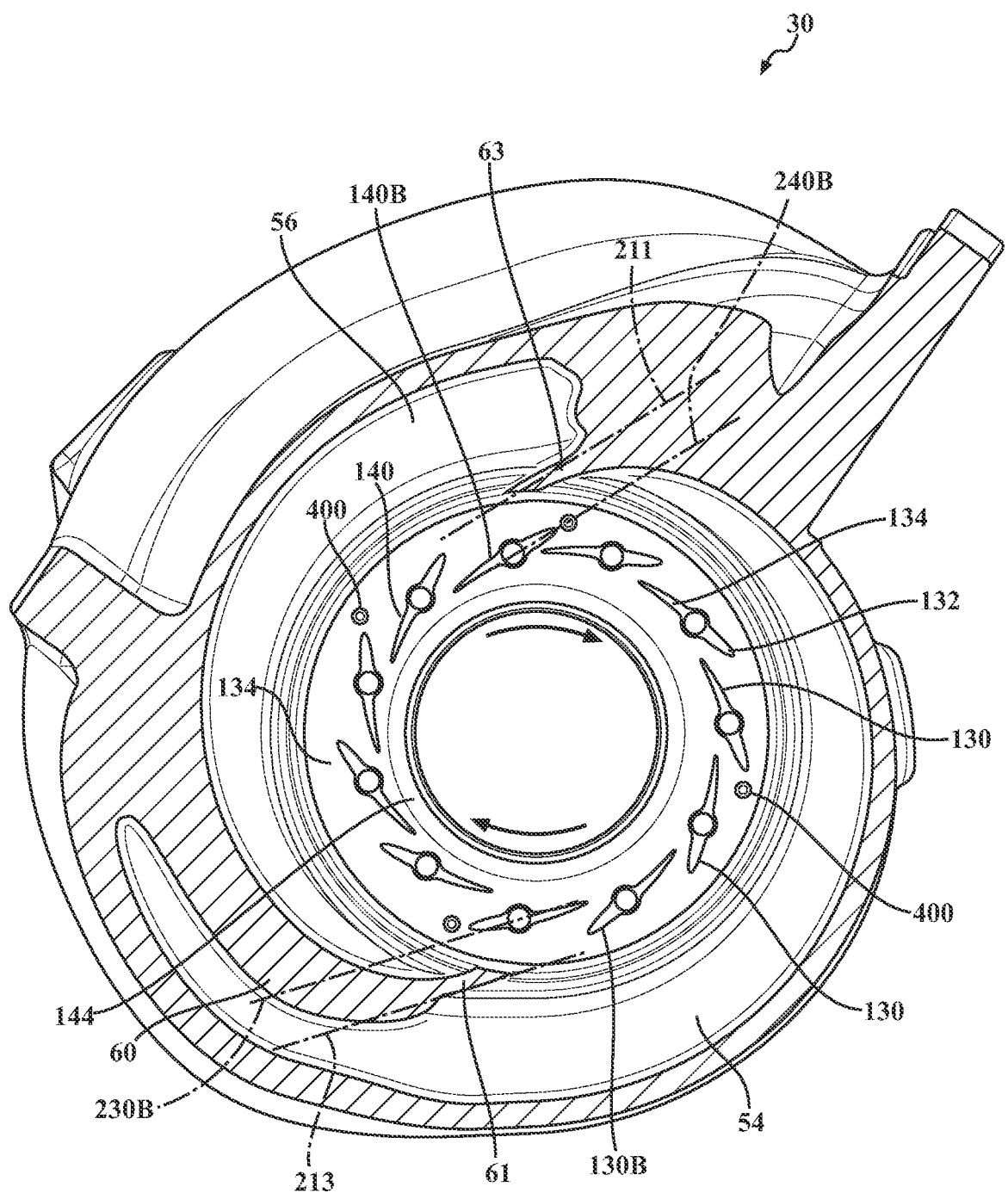
FIG. 4 is an end view of a baseline configuration of the vane ring and a portion of the dual volute turbine housing of FIG. 3 but wherein the annular disk has been clocked such that a lengthwise axis of a closest adjacent tongue vane of each of the first and second set of vanes is not aligned with a corresponding tongue axis of one of the first and second tongues of the wall that divides the first and second volute in an open position.

In one exemplary embodiment, as illustrated in FIG. 4, the location of the vanes 130 are configured such that the respective closest one vane 130B, also referred to as the first tongue vane 130B, of the first set of vanes 130 is adjacent to the first tongue 61, but wherein the first tongue vane axis 230B (defined by the extended virtual length of the first tongue vane 130B) is not aligned along the first tongue axis 211 when the first tongue vane 130B is in the open position. In addition, the location of the vanes 140 are configured such that the respective closest one vane 140B, as referred to as the second tongue vane 140B, of the second set of vanes 140 is adjacent to the second tongue 63, but wherein the virtual extended length of the second tongue vane 140B, which defines a second tongue vane axis 240B, is not aligned along a second tongue axis 213 when the second tongue vane 140B in the open position. In FIG. 4, and corresponding to the definition of adjacent to as provided herein, the respective tongue vanes 130B, 140B represent the closest adjacent vane 130, 140 of each of the first and second set of vanes 130, 140 to the respective tongue 61, 63, This alternation of the location of the respective tongue vanes 130B, 140B from the baseline configuration in FIG. 3 (which include the adjacent tongue vanes 130A, 140A which define respective tongue axes 230A, 240A and which are aligned with the respective tongue axes 211, 213 when the adjacent tongue vanes 130A, 140A are in the open position) allows a small portion of leakage of exhaust gas between the first tongue vane 130B and the first tongue 61, and between the second tongue vane 140B and the second tongue 63 in any relative vane position (i.e., open, closed, or in an intermediate position), and in particular in the open vane position. This small leakage of exhaust gas between the adjacent vane 130B, 140B and the respective tongue vane 61, 63 lessens the aerodynamic forces and mechanical loads applied onto the respective vanes 130, 130B 140, 140B in the closed position or in any van position, which in turn lessens the mechanical loads and wear of the components that are impacted by the forces applied to the vanes 130B, 140B as compared with the baseline configuration in FIG. 3 with aligned vanes 130A, 140A. For example, less wear was exhibited over the same testing cycle on the vane levers 153 that were coupled to the respective vanes 130B, 140B, as well as wear on the adjustment ring 199 adjacent to the location of these vane levers 153, as compared to vanes 130A, 140A, in the baseline configuration of FIG. 3. In the particular embodiment of FIG. 4, the entirety of the vane ring 100 and vanes 130, 140 are clocked (i.e., pivoted) relative to the baseline configuration of FIG. 3, and hence each of the respective vanes 130, 140, 130B, 140B, are clocked/pivoted while maintaining the respective spacing of the vanes 130, 140 on the vane ring 100.

Figure 5:
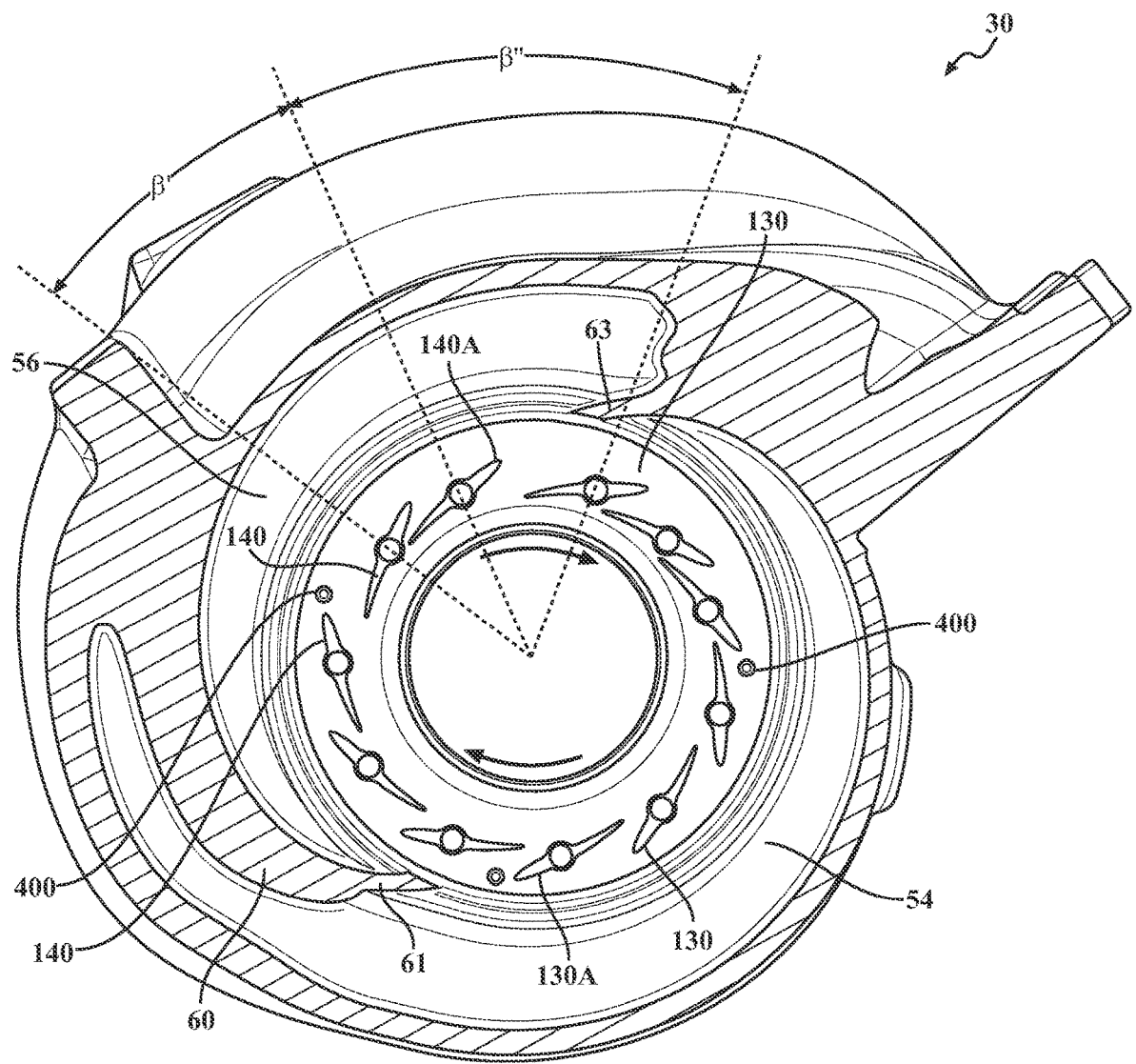
FIG. 5 is an end view of a baseline configuration of the vane ring and a portion of the dual volute turbine housing of FIG. 3 but wherein the annular disk has been clocked and wherein the vanes have been assembled with asymmetric vane spacing.

In another exemplary embodiment, as illustrated in FIG. 5, in addition to adjusting the location of the vanes 130, 130B, 140, 140B as in FIG. 4 by clocking as described above to create the leakage gaps between the adjacent vanes 130B, 140B and the respective tongue vanes 61, 63, an asymmetric spacing between adjacent vanes 130, 130B, 140, 140B is also provided. For example, as shown in FIG. 5, the adjacent spacing between two adjacent vanes 140 and 140B was β', while the spacing between adjacent vanes 140B and 130 was increased to β". Accordingly, during a closed condition, leakage of exhaust gas between the vane 140B and the adjacent vane 130 of the first set of vanes 130, or between adjacent vanes 140 and 140B of the second set of vanes 140 can also occur, small leakage of exhaust gas, which lessens the aerodynamic forces and mechanical loads applied onto the respective vanes 130, 130B, 140, 140B in the closed position and provides similar wear reduction in the VTG components as in FIG. 4.

Figure 6:
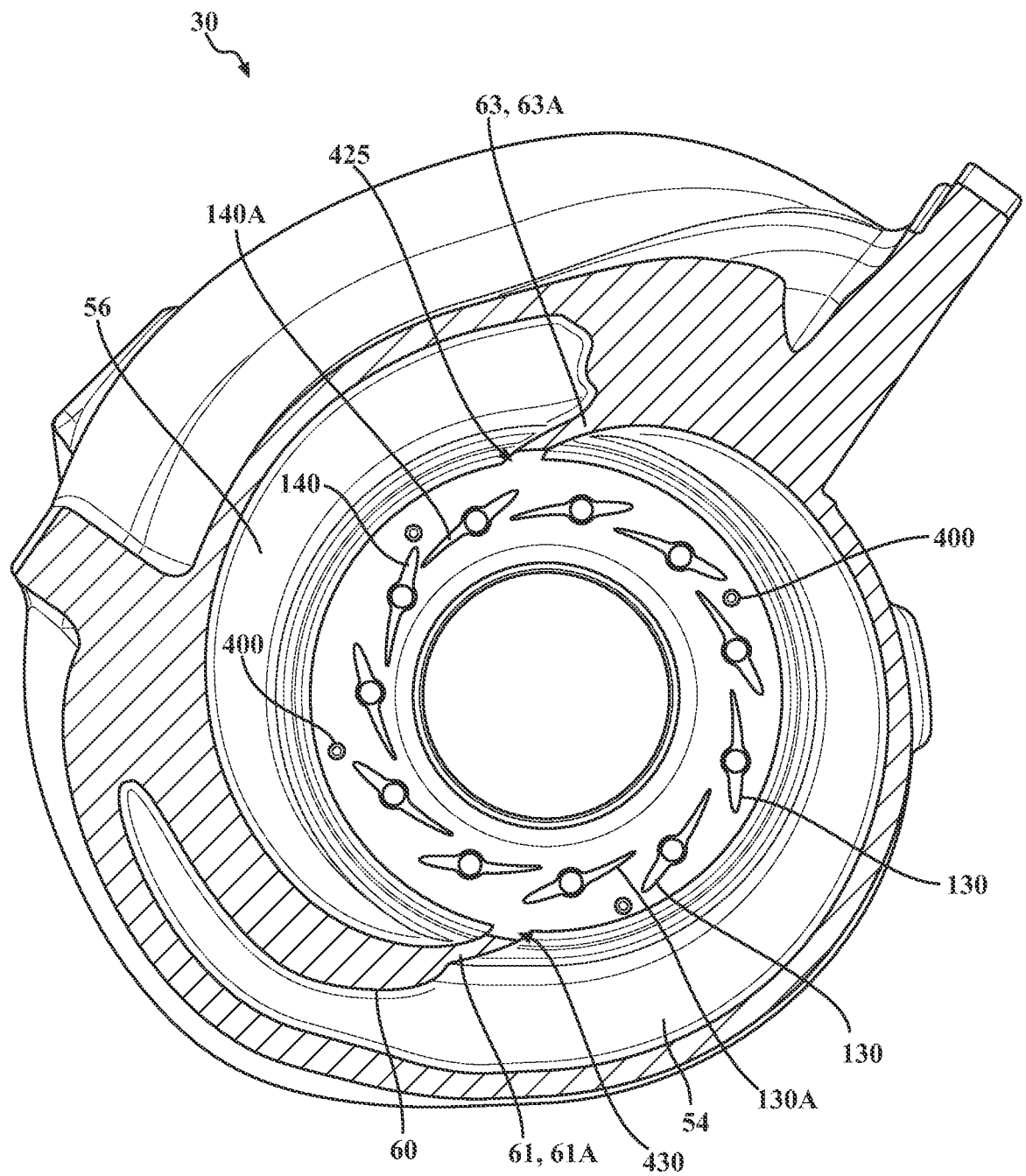
FIG. 6 is an end view of a baseline configuration of the vane ring and a portion of the dual volute turbine housing of FIG. 3 but wherein the first and second tongue vanes have been shortened to increase the clearance between the end of the respective first and second tongue and the corresponding one vane of the first and second sets of vanes.

In another exemplary embodiment, as illustrated in FIG. 6, as opposed to manipulating the vanes 130, 130B, 140, 140B as in FIGS. 4 and 5, the length one or both of the respective tongues 61, 63 is shortened such that it does not extend to the outer circumference 106 of the vane ring 100 (or either of the annular rings 101A, 101B). Accordingly, in the closed position, a gap 425, 435 still exists between the respective vanes 130A, 140A and the respective tongues 61, 63. This alternation of the location of the tongues 61, 63 away from the respective aligned vanes 130A, 140A allows a small portion of leakage of exhaust gas between the adjacent tongue vane 130A and the first tongue 61, and between the adjacent tongue vane 140A and the second tongue 63, in any vane position through the respective gaps 425, 435. This small leakage of exhaust gas through the respective gaps 425, 435 is believed to lessen the aerodynamic forces and mechanical loads applied onto the respective vanes 130, 130A, 140, 140A in any vane position in the same manner described above in FIG. 4 as compared with the baseline configuration in FIG. 3, which in turn is believed to lessen the mechanical loads and wear of the components that are impacted by the forces applied to the vanes 130, 130A, 140, 140A in FIG. 4 as compared with the baseline configuration in FIG. 3.

Figure 7A:
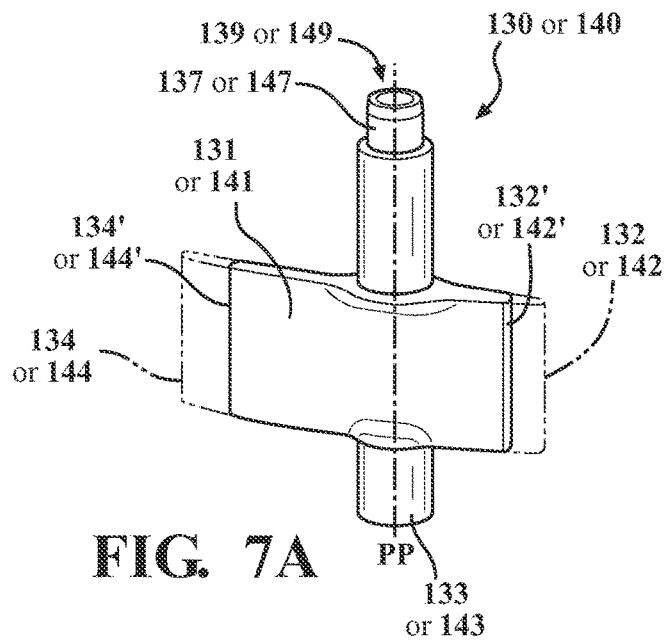
FIG. 7A is a perspective view of one vane of either the first or second set of vanes used in FIG. 3 but wherein the design of one or more vanes of the first and second sets of vanes has been redesigned in accordance with an exemplary embodiment to have a reduced vane length as compared to a corresponding one vane of either the first or second set of vanes used in FIGS. 2 and 3.
Figure 7B:
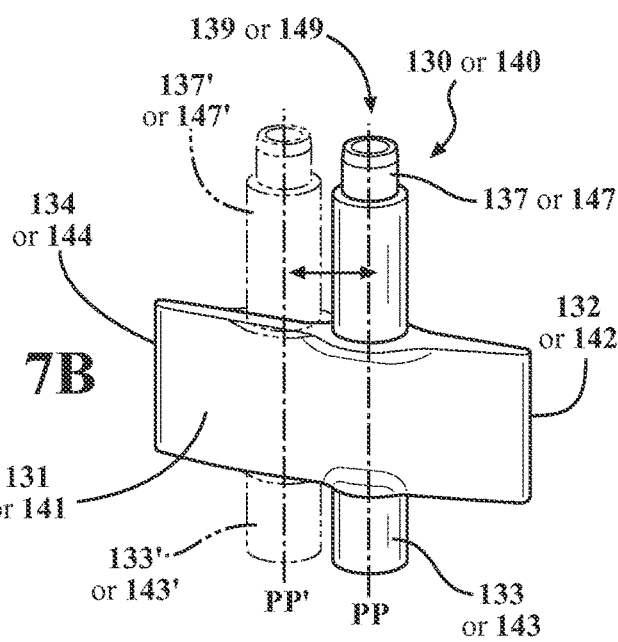
FIG. 7B is a perspective view of one vane of either the first or second set of vanes used in FIG. 3 but wherein the design of one or more vanes of the first and second sets of vanes has been redesigned in accordance with an exemplary embodiment to include an altered pivot location corresponding to the location of the first and second shafts of one vane of the first or second set of vanes as compared to a corresponding one vane of either the first or second set of vanes used in FIGS. 2 and 3.
Figure 7C:
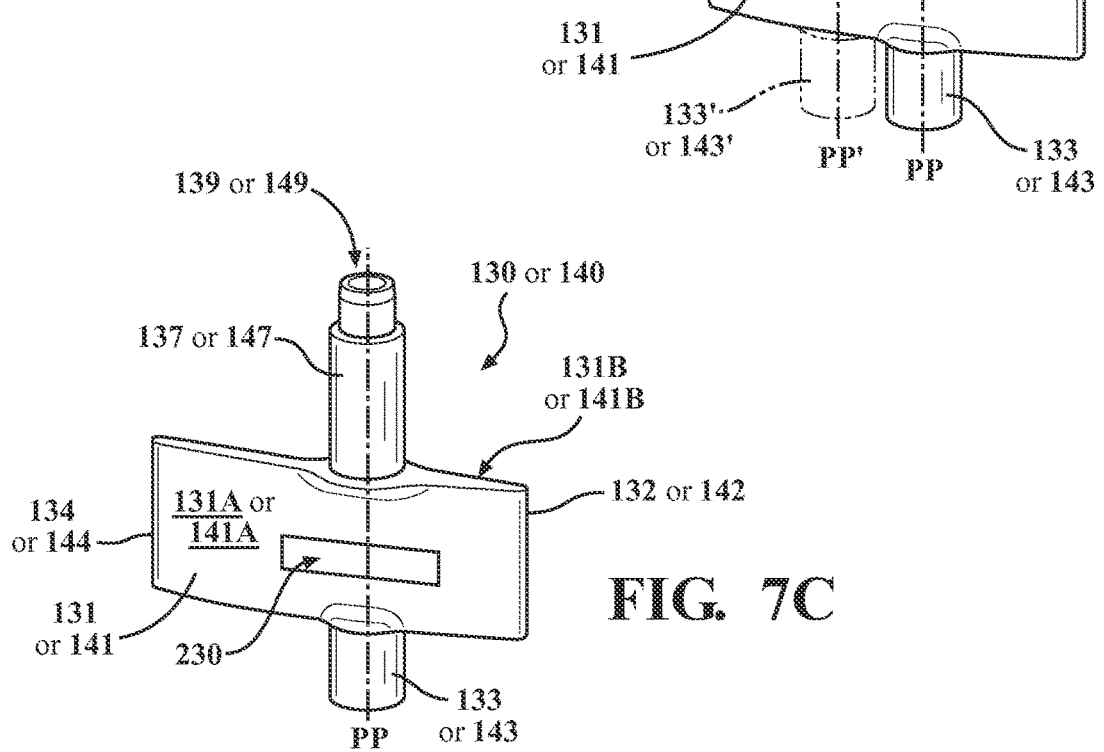
FIG. 7C is a perspective view of one vane of either the first or second set of vanes used in the baseline configuration of FIG. 3 but wherein the design of one or more vanes of the first and second sets of vanes has been redesigned in accordance with an exemplary embodiment to include an air slot not included in a corresponding one vane of either the first or second set of vanes used in FIGS. 2 and 3.

In still other exemplary embodiments, as illustrated in FIGS. 7A, 7B, and 7C for use in altering the baseline configuration of the entryway system 30 of FIG. 3 or for use in the configurations of the entryway system of FIGS. 4 and 5, various modifications are made to one or more of the vanes 130, 140 themselves that allow for exhaust gas leakage either between the vanes 130, 140 or through the vanes 130, 140 when the vanes are rotated to a closed position.

Referring first to FIG. 7A, another exemplary embodiment is illustrated in which one or both of the leading edge 132, 142 and the trailing edge 134, 144 of the vane blade 131, 141 of one or more of the vanes 130, 140 (i.e., the distance between the leading edge 132, 142 and a pivot point PP (i.e., a pivot axis PP), or the trailing edge trailing edge 134, 144 and the pivot point PP, or both) is altered as compared to the baseline configuration as illustrated in FIG. 3. More in particular, the distance between the leading edge 132, 142 and its pivot point PP of its respective shaft 139, 149 of the vane blade 131, 141 of one or more of the respective vanes 130, 140, and/or the distance between the trailing edge 134, 144 and its pivot point PP respective shaft 139, 149 of the vane blade 131, 141 of one or more of the respective vanes 130, 140, is shortened as compared to the baseline configuration of FIG. 3. As illustrated in FIG. 7A, the original leading edge 132, 142 and the trailing edge 134, 144 of the vane blade 131, 141 as in FIG. 3 are respectively shown in phantom lines, while the newer leading edge 132', 142' and the trailing edge 134', 144' of the respective vane blade 131, 141 in accordance with the exemplary embodiment of FIG. 7A are illustrated in solid lines.

This shortening of the vane blade 131, 141 of one or more of the respective vanes 130, 140 allows a small portion of leakage of exhaust gas between any pair of adjacent vane blades (i.e., between adjacent vane blades 131 of the first set of vanes 130; adjacent vane blades 141 of the second set of vanes 140, and/or between adjacent vane blades 131 and 141 of a respective pair of vanes 130 and 140) when the vanes 130, 140 are rotated about the new pivot point PP' to the closed position (i.e., a leakage gap (a representative leakage gap 215 is shown in phantom in FIG. 3 with the vane 130 altered as in FIG. 7—although this gap 215 is not actually present in the configuration of FIG. 3 which illustrates equal length vanes 130, 140 that close in a manner wherein leakage gaps are not present but is merely representative of where such a gap would be in the configuration of FIG. 7) is created between the newer leading edge 132', 142' and the adjacent trailing edge 134, 144 or 134', 144' of a respective pair of adjacent vane blades 131, 131 of a pair of vanes 130, 130; a respective pair of adjacent vane blades 141, 141 of a respective pair of vanes 140, 140; or a respective pair of vane blades 131, 141 of a respective pair of vanes 130, 140; when rotated to the closed position). Similar to the embodiments of FIGS. 4-6, this leakage gap 215 lessens the mechanical loads and wear of the VTG components that are impacted by the aerodynamic forces applied to the vanes 130, 140.

Referring next to FIG. 7B, yet another exemplary embodiment is illustrated in which the relative location of the shafts 139, 149 on one or both of the vane blades 131, 141 of the baseline configuration as illustrated in FIG. 3 are shifted to a new position (identified as 133', 137', 143', 147' in phantom in FIG. 7B) relative to their respective leading edge 132, 142 and trailing edge 134, 144 of the respective vane blade 131, 141 but wherein the overall length of the vane blades 131, 141 of the baseline configuration as illustrated in FIG. 3 between the respective leading edge 132, 142 and trailing edge 134, 144 remains constant. This shifting changes the pivot point PP of the respective vane 130, 140 of the baseline configuration of FIG. 3 to pivot point PP' (also shown by arrow PP' in phantom in FIG. 7B), which changes the pressure profile applied to the vanes 130, 140 which can change the aerodynamic forces and mechanical loads applied onto the respective vanes 130A, 140A in any vane position to mitigate the mechanical loads and wear of the components that are impacted by the forces applied to the vanes 130, 140 in a manner similar to allowing leakage as in FIGS. 4-6 and 7A.

In certain embodiments, the shifting is such that a first distance, defined as the distance between the respective leading edge 132, 142 of one vane 130, 140 and the pivot point PP, is less than a second distance defined between the respective leading edge 132', 142' and the new pivot point PP' of the same, but modified, one vane 130, 140 (and wherein a first distance between the respective trailing edge 134, 144 of one vane 130, 140 and the pivot point PP, is greater than a second distance defined between the respective trailing edge 134', 144' and the new pivot point PP' of the same, but modified, one vane 130, 140).

In still another alternative (not shown), the shifting could be in the opposite direction, in which the shifting is such that a first distance, defined as the distance between the respective leading edge 132, 142 of one vane 130, 140 and the pivot point PP, is greater than a second distance defined between the respective leading edge 132', 142' and the new pivot point PP' of the same, but modified, one vane 130, 140 (and wherein a first distance between the respective trailing edge 134, 144 of one vane 130, 140 and the pivot point PP, is less than a second distance defined between the respective trailing edge 134', 144' and the new pivot point PP' of the same, but modified, one vane 130, 140).

In still further related embodiments, vane blades 130, 140 are also contemplated having a combination of attributes of FIGS. 7A and/or 7B. In particular, in one exemplary embodiment one but less than all of the vane blade 130 or 140 may be shortened as in FIG. 7A, while another one but less than all of the vane blade 130 or 140 may be shifted as in FIG. 7B. In still further exemplary embodiments, one or more but less than all of the vanes 130 or 140 may be shortened and shifted.

Referring next to FIG. 7C, still yet another exemplary embodiment is illustrated in which a slot opening 230 is defined through one or more of the vanes 130, 140 between the inner surface 131A, 141A and the outer surface 131B, 141B (with the distance 140 between the inner surface 131A, 141A and the outer surface 131B, 141B as defined as the width of the respective vane 130, 140) in a location between the respective leading edge 132, 142 and trailing edge 134, 144. This slot opening 230 functions as a leakage path for exhaust gas through the vanes 130, 140 when the vanes 130, 140 in any vane position, including a closed position. Similar to the embodiments of FIGS. 4-6, this leakage through the slot 230 lessens the mechanical loads and wear of the VTG components that are impacted by the aerodynamic forces applied to the vanes 130, 140.

In still a further related embodiment to FIGS. 7A-7C, a vane configuration can be presented in which one or more of the first and second set of vanes 130, 140 includes a combination of the features of FIG. 7A and FIG. 7B, alone or in combination with the features of FIG. 7C. By way of example, one vane 130 and 140 of either or each of the first and second set of vanes 130, 140 could be shortened as described and illustrated above in FIG. 7A, whereas another vane 130 and/or 140 or wherein the same vane 130 and/or 140 of each of the first and second set of vanes could have a shifted pivot point PP as described and illustrated above in FIG. 7B, and where any one of the vanes 130, 140 in this alternative configuration includes the slot opening 230 as described and illustrated above in FIG. 7C.

Figure 8:
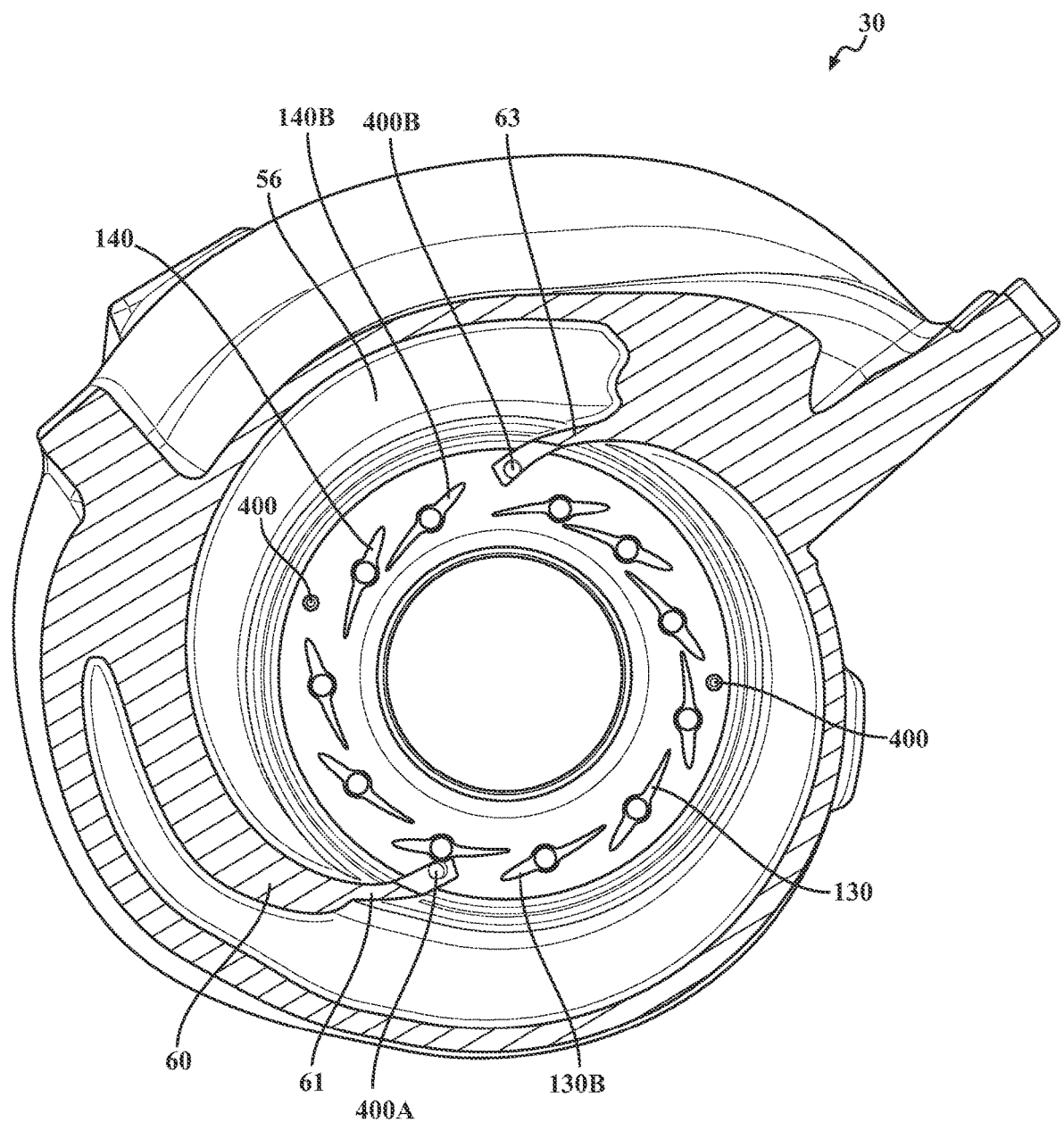
FIG. 8 is an end view of a baseline configuration of the vane ring and a portion of the dual volute turbine housing of FIG. 3 but wherein the design of the baseline configuration has been altered in accordance with an exemplary embodiment to include two aerodynamics spacers that extend from each of the first and second tongues of the wall that divides the first and second volute in a manner such that a closest adjacent vane of each of the first and second set of vanes is not aligned along an axis with a corresponding one of the aerodynamic spacers extending from the first and second tongues of the wall.

In yet another exemplary embodiment, as illustrated in FIG. 8, typically used in conjunction with the alternative vane 130, 140 arrangement of FIG. 5 in which the adjacent vane 130B, 140B is not aligned along an axis with the respective tongue 61, 63 (as also shown in FIG. 4) and in which asymmetric vane spacing is utilized, a first one 400A of the plurality of spacers 400 is positioned adjacent to the first tongue 61 of the wall 60, while a second one 400B of the plurality of spacers is positioned adjacent to the second tongue 63 of the wall 60. The term "adjacent to", as defined herein with respect to the relationship of the first one 400A and second one 400B of the spacers 400, refers to the positioning of the respective first one 400A or second one 400B of the spacers circumferentially outward of the vanes 130A, 140A and along a radial line (RL) extending from the axis of rotation of the turbine wheel 42 to the respective first or second tongue 61, 63. The respective first one 400A or second one 400B may be positioned adjacent to the outer circumferential ring 106 such that the respective first one 400A or second one 400B of the spacers 400 is aligned and generally flush to the respective first or second tongue 61, 63, or may be positioned slightly inward of the outer circumferential ring 106 so that a small gap may exist between the respective first one 400A or second one 400B of the spacers 400 and the respective first or second tongue 61, 63. In addition, the respective circumferentially inward most portion of the respective first one 400A or second one 400B are generally spaced circumferentially outward a sufficient distance from a respective adjacent one of the vanes 130A, 140B to allow the vane 130A, 140B to rotate between the open and closed position.

In addition to assisting in adjusting the flow of exhaust gas entering from the respective first or second volute 54, 56 prior to being received by the turbine blades of the turbine wheel 42, the first one 400A and second one 400B of the spacers 400 function to reduce scroll to scroll leakage that occurs between one of the vanes 130A, 140A and one of the respective tongues 61, 63 during operation of the entryway system 30 in each of the intermediate positions and open position as compared with entryway systems that do not include such spacers 400A, 400B. However, because the first one 400A and the second one 400B of the spacers 400 do not contact the respective vanes 130A or 140A in the closed position, a small portion of leakage of exhaust gas between the vane 130A and the first one 400A spacer, and between the vane 140A and the second one spacer 400B in any vane position. This leakage of exhaust gas lessens the aerodynamic forces and mechanical loads applied onto the respective vanes 130A, 140A in the closed position in the same manner described above in FIG. 4, which in turn lessens the mechanical loads and wear of the components that are impacted by the forces applied to the vanes 130A, 140A.

Figure 9:
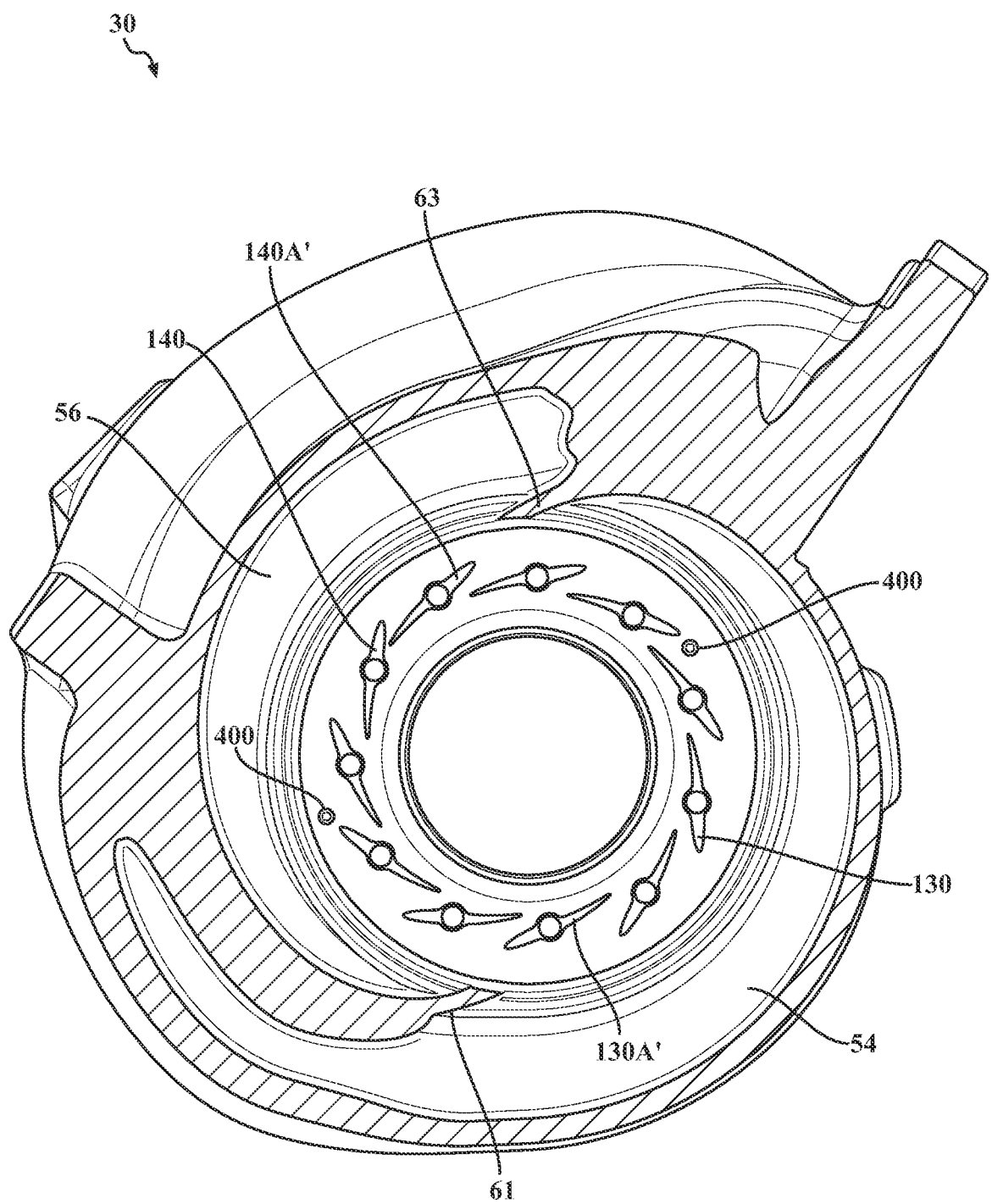
FIG. 9 is an end view of a baseline configuration of the vane ring and a portion of the dual volute turbine housing of FIG. 3 in accordance with another exemplary embodiment but wherein one vane of each of the first and second set of vanes most adjacent to the respective first and second tongues of the wall that divides the first and second volute is fixed to the annular disk.

In yet a still further embodiment, as illustrated in FIG. 9, the adjacent vanes 130A and/or 140A may be fixed vanes, referred to by reference numbers 130A', 140A', as opposed to rotating vanes 130A, 140A as in the baseline configuration of FIG. 3. In this embodiment, the remainder of the first set of vanes 130 and second set of vanes 140 remain as rotatable vanes 130, 140. These fixed vanes 130A', 140A' are welded or otherwise secured to the annular ring 101A, and thus do not rotate in conjunction with the rotation of the remainder of the first set of vanes 130 and second set of vanes 140 between the open and closed position. As such, when the first set of vanes 130 and second set of vanes 140 are rotated to the closed position, a gap still exists between the respective fixed vanes 130A', 140A' and the respective tongues 61, 63. This allows a small portion of leakage of exhaust gas between the fixed vane 130A and the first tongue 61, and between the vane 140A and the second tongue 63 in any vane position. Still further, a small portion of leakage of exhaust gas also occurs between the fixed vane 130A' or 140A' and adjacent respective ones of the first and second set of vanes 130, 140. These paths of leakage all individually lessens the mechanical loads and wear of the components that are impacted by the forces applied to the fixed vanes 130A', 140A' and other vanes 130, 140 during usage.

In still further embodiments, any combination of the features of the embodiments of FIGS. 4-9 may be used in combination with each other, which combines the features to create varying alternative paths of leakage that all individually or in combination lessen the mechanical loads and wear of the components that are impacted by the forces applied to the vanes 130, 140 (movable or fixed) during usage as compared to those provided in the baseline configuration of FIG. 3.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An entryway system comprising:
   a divided volute turbocharger for receiving exhaust gas from an internal combustion engine and for delivering compressed air to the internal combustion engine, the internal combustion engine including a first group of cylinders and a second group of cylinders, said divided volute turbocharger comprising:
      a turbine housing comprising a turbine housing interior adapted to receive a turbine wheel having a plurality of equally spaced turbine blades,
      a first volute adapted for fluid communication with the internal combustion engine and said turbine housing interior for delivering exhaust gas from the first group of cylinders to said turbine housing interior,
      a second volute adapted for fluid communication with the internal combustion engine and said turbine housing interior for delivering exhaust gas from the second group of cylinders to said turbine housing interior independently of said first volute,
      a turbine housing outlet in fluid communication with said turbine housing interior, and
      a wall separating said first volute from said second volute and including a first tongue and a second tongue spaced from said first tongue; and
   a vane ring disposed in said turbine housing interior between said first and second volutes and around said turbine wheel, said vane ring comprising an annular disk including a vane ring surface disposed between an inner circumferential ring and an outer circumferential ring with said inner circumferential ring defining an orifice for receiving said turbine wheel, said vane ring surface defining a plurality of openings extending between an upper surface and an opposing lower surface, said vane ring comprising a plurality of vanes dividing said vane ring surface into a first arcuate region and a second arcuate region, with one of said plurality of vanes disposed within a respective one of said openings in said vane ring, wherein at least two of said plurality of vanes are moveable between an open position and a closed position about a pivot axis with each of said plurality of vanes comprising:
- a lower shaft received in one opening of said plurality of openings of said vane ring,
- an upper shaft, with a length of said upper shaft axially aligned with a length of said lower shaft so as to define said pivot axis, and
- a vane blade coupled to each of said lower shaft and said upper shaft and extending in length between a leading edge and a trailing edge, wherein a gap defined between said leading edge of one vane blade of said plurality of vane blades and said trailing edge of an adjacent one vane blade of a first adjacent pair of said plurality of vane blades in said closed position is different in length than a gap defined between said leading edge of one vane blade of said plurality of vane blades and said trailing edge of an adjacent one vane blade of a second adjacent pair of said plurality of vane blades in said closed position, wherein said plurality of vanes includes a first tongue vane positioned adjacent to said first tongue and a second tongue vane positioned adjacent to said second tongue, and wherein the entryway system further comprises:
- a first spacer positioned on said vane ring surface of said annular disk adjacent to said outer circumferential ring with said first spacer aligned along an axis with and extending from said first tongue vane when said first tongue vane is in said open position, and
- a second spacer positioned on said vane ring surface of said annular disk adjacent to said outer circumferential ring with said second spacer aligned along an axis with said second tongue vane when said second tongue vane is in said open position.

2. The entryway system of claim 1, wherein said gap between said leading edge of one vane blade of said plurality of vane blades and said trailing edge of an adjacent one vane blade is defined in a circumferential direction of said vane ring.

3. The entryway system of claim 1, wherein said gap between said leading edge of one vane blade of said plurality of vane blades and said trailing edge of an adjacent one vane blade is defined in a radial direction of said vane ring.

4. The entryway system of claim 1, wherein said length of said vane blade of at least one of said first adjacent pair of vane blades is shorter than said length of said vane blade of at least one of said second adjacent pair of vane blades.

5. The entryway system of claim 1, wherein one or more vane blades of said plurality of vanes defines a slot extending through an inner surface and outer surface between said trailing edge and said leading edge with each of said one or more vane blades extending in width between said inner and outer surface.

6. The entryway system of claim 1,
wherein a length of said first tongue does not extend to said outer circumferential ring so as to define a gap between said first tongue and said first tongue vane when said first tongue vane is in said open position, or
wherein a length of said second tongue does not extend to said outer circumferential ring so as to define gap between said second tongue and said second tongue vane when said first tongue vane is in said open position, or
wherein a length of each of said first tongue and said second tongue do not respectively extend to said outer circumferential ring so as to define a gap between said first tongue and said first tongue vane when said first tongue vane is in said open position and so as to define a gap between said second tongue and said second tongue vane when said second tongue vane is in said open position.

7. The entryway system of claim 1, wherein said plurality of vanes includes a first set of vanes disposed in a spaced apart manner along said first arcuate surface and a second set of vanes disposed in a spaced apart manner along said second arcuate surface, and wherein at least one vane of said first set of vanes or at least one vane of said second set of vanes comprises a fixed vane and wherein another one vane of said first set of vanes or another one vane of said second set of vanes comprises a moveable vane moveable between said open position and said closed position.

8. An entryway system comprising:
a divided volute turbocharger for receiving exhaust gas from an internal combustion engine and for delivering compressed air to the internal combustion engine, the internal combustion engine including a first group of cylinders and a second group of cylinders, said divided volute turbocharger comprising:
- a turbine housing comprising a turbine housing interior adapted to receive a turbine wheel having a plurality of equally spaced turbine blades,
- a first volute adapted for fluid communication with the internal combustion engine and said turbine housing interior for delivering exhaust gas from the first group of cylinders to said turbine housing interior,
- a second volute adapted for fluid communication with the internal combustion engine and said turbine housing interior for delivering exhaust gas from the second group of cylinders to said turbine housing interior independently of said first volute,
- a turbine housing outlet in fluid communication with said turbine housing interior, and
- a wall separating said first volute from said second volute and including a first tongue and a second tongue spaced from said first tongue; and
a vane ring disposed in said turbine housing interior between said first and second volutes and around said turbine wheel, said vane ring comprising an annular disk including a vane ring surface disposed between an inner circumferential ring and an outer circumferential ring with said inner circumferential ring defining an orifice for receiving said turbine wheel, said vane ring surface defining a plurality of openings extending between an upper surface and an opposing lower surface, said vane ring comprising a plurality of vanes dividing said vane ring surface into a first arcuate region and a second arcuate region, with one of said plurality of vanes disposed within a respective one of said openings in said vane ring, wherein at least two of said plurality of vanes are moveable between an open and a closed position about a pivot axis with each of said plurality of vanes comprising:
- a lower shaft received in one opening of said plurality of openings of said vane ring,
- an upper shaft, with a length of said upper shaft axially aligned with a length of said lower shaft so as to define said pivot axis, and
- a vane blade coupled to each of said lower shaft and said upper shaft and extending in length between a leading edge and a trailing edge with a length of each vane blade of said plurality of vanes measured between said leading edge and said trailing edge being equal, wherein a first distance between said leading edge and said pivot axis of said vane blade of one of said plurality of vanes is different than a second distance between said trailing edge and said pivot axis of said vane blade of said one of said plurality of vanes, and wherein said plurality of vanes includes a first tongue vane positioned adjacent to said first tongue and a second tongue vane positioned adjacent to said second tongue, and wherein the entryway system further comprises:

a first spacer positioned on said vane ring surface of said annular disk adjacent to said outer circumferential ring with said first spacer aligned along an axis with and extending from said first tongue vane, and a second spacer positioned on said vane ring surface of said annular disk adjacent to said outer circumferential ring with said second spacer aligned along an axis with said second tongue vane.

9. The entryway system of claim 8, wherein one or more vane blades of said plurality of vanes defines a slot extending through an inner surface and outer surface between said trailing edge and said leading edge with each of said one or more vane blades extending in width between said inner and outer surface.

10. The entryway system of claim 8, wherein said plurality of vanes includes a first tongue vane positioned adjacent to said first tongue and a second tongue vane positioned adjacent to said second tongue, and wherein a length of said first tongue does not extend to said outer circumferential ring so as to define a gap between said first tongue and said first tongue vane when said first tongue vane is in said open position, or wherein a length of said second tongue does not extend to said outer circumferential ring so as to define gap between said second tongue and said second tongue vane when said first tongue vane is in said open position, or wherein a length of each of said first tongue and said second tongue do not respectively extend to said outer circumferential ring so as to define a gap between said first tongue and said first tongue vane when said first tongue vane is in said open position and so as to define a gap between said second tongue and said second tongue vane when said second tongue vane is in said open position.

11. The entryway system of claim 8, wherein said plurality of vanes includes a first set of vanes disposed in a spaced apart manner along said first arcuate surface and a second set of vanes disposed in a spaced apart manner along said second arcuate surface, and wherein at least one vane of said first set of vanes or at least one vane of said second set of vanes comprises a fixed vane and wherein another one vane of said first set of vanes or another one vane of said second set of vanes comprises a moveable vane moveable between said open position and said closed position.

12. The entryway system of claim 8, wherein a gap defined between said leading edge of one vane blade of said plurality of vane blades and said trailing edge of an adjacent one vane blade of a first adjacent pair of said plurality of vane blades in said closed position is different in length than a gap defined between said leading edge of one vane blade of said plurality of vane blades and said trailing edge of an adjacent one vane blade of a second adjacent pair of said plurality of vane blades in said closed position.

13. The entryway system of claim 12, wherein said gap between said leading edge of one vane blade of said plurality of vane blades and said trailing edge of an adjacent one vane blade is defined in a circumferential direction of said vane ring.

14. The entryway system of claim 12, wherein said gap between said leading edge of one vane blade of said plurality of vane blades and said trailing edge of an adjacent one vane blade is defined in a radial direction of said vane ring.

15. An entryway system comprising:

a divided volute turbocharger for receiving exhaust gas from an internal combustion engine and for delivering compressed air to the internal combustion engine, the internal combustion engine including a first group of cylinders and a second group of cylinders, said divided volute turbocharger comprising:

a turbine housing comprising a turbine housing interior adapted to receive a turbine wheel having a plurality of equally spaced turbine blades, a first volute adapted for fluid communication with the internal combustion engine and said turbine housing interior for delivering exhaust gas from the first group of cylinders to said turbine housing interior, a second volute adapted for fluid communication with the internal combustion engine and said turbine housing interior for delivering exhaust gas from the second group of cylinders to said turbine housing interior independently of said first volute, a turbine housing outlet in fluid communication with said turbine housing interior, and a wall separating said first volute from said second volute and including a first tongue and a second tongue spaced from said first tongue; and a vane ring disposed in said turbine housing interior between said first and second volutes and around said turbine wheel, said vane ring comprising an annular disk including a vane ring surface disposed between an inner circumferential ring and an outer circumferential ring with said inner circumferential ring defining an orifice for receiving said turbine wheel, said vane ring surface defining a plurality of openings extending between an upper surface and an opposing lower surface, said vane ring comprising a plurality of vanes dividing said vane ring surface into a first arcuate region and a second arcuate region, with one of said plurality of vanes disposed within a respective one of said openings in said vane ring, wherein at least two of said plurality of vanes are moveable between an open and a closed position about a pivot axis with each of said plurality of vanes comprising:

a lower shaft received in one opening of said plurality of openings of said vane ring, an upper shaft, with a length of said upper shaft axially aligned with a length of said lower shaft so as to define said pivot axis, and a vane blade coupled to each of said lower shaft and said upper shaft and extending in length between a leading edge and a trailing edge with a length of each vane blade of said plurality of vanes measured between said leading edge and said trailing edge being equal, wherein a first distance between said leading edge and said pivot axis of said vane blade of one of said plurality of vanes is different than a second distance between said trailing edge and said pivot axis of said vane blade of said one of said plurality of vanes, and wherein a gap defined between said leading edge of one vane blade of said plurality of vane blades and said trailing edge of an adjacent one vane blade of a first adjacent pair of said plurality of vane blades in said closed position is different in length than a gap defined between said leading edge of one vane blade of said plurality of vane blades and said trailing edge of an adjacent one vane blade of a second adjacent pair of said plurality of vane blades in said closed position.

16. The entryway system of claim 15, wherein said gap between said leading edge of one vane blade of said plurality of vane blades and said trailing edge of an adjacent one vane blade is defined in a circumferential direction of said vane ring.

17. The entryway system of claim 15, wherein said gap between said leading edge of one vane blade of said plurality of vane blades and said trailing edge of an adjacent one vane blade is defined in a radial direction of said vane ring.

\* \* \* \* \*